US011342173B2

(12) United States Patent
Arnold

(10) Patent No.: US 11,342,173 B2
(45) Date of Patent: May 24, 2022

(54) ELECTROSPRAY INTERFACE DEVICE AND ASSOCIATED METHODS

(71) Applicant: DH Technologies Development Pte. Ltd.

(72) Inventor: Don W. Arnold, Livermore, CA (US)

(73) Assignee: DH Technologies Development Pte. Ltd., Singapore (SG)

(*) Notice: Subject to any disclaimer, the term of this patent is extended or adjusted under 35 U.S.C. 154(b) by 193 days.

(21) Appl. No.: 16/628,916

(22) PCT Filed: Jun. 29, 2018

(86) PCT No.: PCT/IB2018/054873
§ 371 (c)(1),
(2) Date: Jan. 6, 2020

(87) PCT Pub. No.: WO2019/008492
PCT Pub. Date: Jan. 10, 2019

(65) Prior Publication Data
US 2020/0126779 A1  Apr. 23, 2020

Related U.S. Application Data

(60) Provisional application No. 62/530,018, filed on Jul. 7, 2018.

(51) Int. Cl.
*H01J 49/00* (2006.01)
*H01J 49/16* (2006.01)
*G01N 27/447* (2006.01)
*G01N 30/72* (2006.01)

(52) U.S. Cl.
CPC ........ *H01J 49/167* (2013.01); *G01N 27/4473* (2013.01); *G01N 30/7266* (2013.01)

(58) Field of Classification Search
CPC .. H01J 49/167; H01J 49/165; G01N 27/4473; G01N 30/7266
USPC .......................... 250/281, 282, 288
See application file for complete search history.

(56) References Cited

U.S. PATENT DOCUMENTS

| | | | | |
|---|---|---|---|---|
| 5,580,434 A | * | 12/1996 | Robotti | G01N 27/44717 204/451 |
| 7,544,932 B2 | * | 6/2009 | Janini | B05B 5/0255 250/281 |
| 2010/0001181 A1 | * | 1/2010 | Moini | G01N 27/4473 250/282 |
| 2014/0054809 A1 | | 2/2014 | Lozano et al. | |
| 2015/0311056 A1 | * | 10/2015 | Dovichi | G01N 30/7266 250/282 |

(Continued)

FOREIGN PATENT DOCUMENTS

WO    2015092501 A1    6/2015

OTHER PUBLICATIONS

International Search Report and Written Opinion for PCT/IB2018/054873 dated Oct. 31, 2018.

(Continued)

*Primary Examiner* — Michael Maskell

(57) ABSTRACT

Apparatus, systems, and methods in accordance with various aspects of the applicant's teachings provide for improved interfaces for providing a sample flow from a sample conduit (e.g., an analytical conduit or capillary), including those used in sample separation techniques such as CE and HPLC, to an ESI source for ionization thereby.

19 Claims, 8 Drawing Sheets

(56) References Cited

U.S. PATENT DOCUMENTS

2015/0338384 A1  11/2015  Stevens

OTHER PUBLICATIONS

Gregoire Bonvin et al: "Capillary electrophoresis-electrospray ionization-mass spectrometry interfaces: Fundamental concepts and technical developments", Journal of Chromatography A, vol. 1267, Jul. 15, 2012 (Jul. 15, 2012), pp. 17-31.

Chenchen Wang et al: 11 Capillary Isotachophoresis-Nanoelectrospray Ionization-Selected Reaction Monitoring MS via a Novel Sheathless Interface for High Sensitivity Sample Quantification 11, Analytical Chemistry, vol. 85, No. 15, Aug. 6, 2013 (Aug. 6, 2013), pp. 7308-7315.

\* cited by examiner

ELECTROSPRAY INTERFACE DEVICE AND ASSOCIATED METHODS

RELATED APPLICATIONS

This application claims the benefit of priority from U.S. Provisional Application No. 62/530,018, filed on Jul. 7, 2017, the entire contents of which are incorporated by reference herein.

FIELD

The present teachings relate to methods, systems, and apparatus for interfacing a sample flow from a sample source including infusion or direction injection and low-flow sample separation techniques such as capillary electrophoresis (CE) and high-performance liquid chromatography (HPLC) to electrospray ionization (ESI) sources for mass spectrometric analysis.

INTRODUCTION

Mass spectrometry (MS) is an analytical technique for determining the elemental composition of test substances with both qualitative and quantitative applications. MS can be useful for identifying unknown compounds, determining the isotopic composition of elements in a molecule, determining the structure of a particular compound by observing its fragmentation, and quantifying the amount of a particular compound in a sample. Mass spectrometers detect chemical entities as ions such that a conversion of the analytes to charged ions must occur during the sampling process. Due to the accuracy and sensitivity requirements for most MS applications, complex samples are generally subjected to separation techniques prior to ionization. For example, to achieve high resolution and high sensitivity using ESI, separation techniques using narrow columns/capillaries and exhibiting low flow rates, such as nano-liquid chromatography (nano-LC) and capillary electrophoresis (CE), have become wide spread. In HPLC-MS techniques, small inner diameter reverse phase columns (e.g., inner diameters of ~75 μm to several millimeters) exhibiting low flow rates (e.g., in a range of less than 1 μL/min to more than 1 mL/min) are commonly utilized in proteomics study, with separation occurring due to differences in the interactions of the analytes with the mobile and stationary phases. Similarly, in CE-MS, a narrow capillary (e.g., ~50-75 μm inner diameter exhibiting flow rates of about 250 nL/min) is commonly utilized to effect separation of sample analytes within a conductive fluid due to differences of the analytes' electrophoretic mobilities under an applied electric field.

A need remains to improve the delivery of sample fluids from a variety of sample sources to ESI sources, including those sample sources utilizing small diameter capillaries or fluidic conduits in low sample flow separation techniques such as HPLC or CE, while improving the manufacturability of the analytical conduit and the ion source emitter.

SUMMARY

Apparatus, systems, and methods in accordance with various aspects of the applicant's teachings provide for improved interfaces for providing a sample flow from a sample source (e.g., infusion, direct injection). In some exemplary aspects, the sample flow can be provided through an analytical conduit (e.g., an analytical capillary) used in sample separation techniques such as CE and HPLC to an ESI source for ionization thereby.

In accordance with various aspects of the applicant's teachings, a device for interfacing with an electrospray ionization source is provided that comprises a first conduit (e.g., an analytical conduit) defining a first microchannel for fluid flow (the first microchannel having an entrance end for receiving a fluid sample containing one or more analytes of interest and an exit end for transmitting said fluid sample therefrom) and a second conduit (e.g., an ESI emitter) defining a second microchannel for fluid flow (the second microchannel having an entrance end for receiving the fluid sample transmitted from the exit end of the first microchannel and a discharge end for discharging said fluid sample into an ionization chamber of a mass spectrometer system). At least a portion of the second conduit can comprise a porous surface, and the second conduit can be coupled to the first conduit such that the exit end of the first microchannel is aligned with the microchannel of the second conduit so as to allow continuous fluid flow from the exit end of the first microchannel into the entrance end of the second microchannel. The interface also comprises a housing at least partially surrounding the first and second conduit and defining a fluid chamber between an inner surface of the housing and the porous surface of the second conduit, the housing having at least one opening through which the second conduit extends from within the housing into the ionization chamber. An electrode, configured to be disposed in fluid contact with a conductive fluid contained within the fluid chamber, can be coupled to a power supply so as to provide an electrical current between the conductive fluid and the fluid sample within the second microchannel via the porous surface.

The first and second conduits can be coupled in a variety of manners. By way of example, a coupling mechanism can be provided to surround a junction of the first and second conduits so as to provide a fluid tight seal between the microchannels of the first and second conduits. In some aspects, for example, the coupling mechanism can be configured to maintain the alignment of the first and second conduits by compression fit. Exemplary materials in such aspects include flexible and/or elastomeric materials that can be stretched about the exit end of the first conduit and the entrance end of the second conduit. In some aspects, the coupling mechanism can comprise a material that can shrink, for example, upon the application of heat such that the shrinking materials serves to secure and align the first and second conduits with one another. Additionally or alternatively, the coupling mechanism can comprise a coupling body having a bore extending therethrough into which the first and second conduits can be partially inserted. In related aspects, the coupling body can be adhered (e.g., via a UV-curable adhesive) to the first and/or second conduits upon alignment. In some aspects, the coupling mechanism can comprise a mechanical fixture (e.g., a clamp). In various aspects, for example, the housing can comprise two bodies, each of which comprises a groove configured to fit an outer diameter of the first and second conduits such that the first and second conduits are fluidically coupled when disposed in the groove and the two bodies are joined together (e.g., clamped). In some aspects, the groove can comprise a compressible material (e.g., silicon) such that the material conforms to the outer diameter of the conduits when the housing bodies are joined to securely retain the conduits. The electrode, configured to be in electrical contact with the conductive fluid within the housing as noted above, can be a portion of the housing and/or coupling mechanism in various aspects.

The first and second conduits can have a variety of configurations, shapes, and sizes, and can be comprised of a variety of materials (the same or different from one another). By way of example, in some aspects, the first conduit can comprise a capillary electrophoresis device and the second conduit can comprise an electrospray emitter. In various aspects, the first conduit can comprise quartz and the second conduit can comprise silica. In some aspects, an inner diameter of the first and second conduits is substantially equal. The porous surface of the second conduit can also have a variety of configurations, for example, the surface area of the porous surface and/or the number or size of pores that comprise the porous surface. In some aspects, the porous surface can comprise a plurality of pores having an average size in a range of about 1 nm to about 40 nm or in a range of about 40 nm to about 100 nm.

In accordance with various aspects of the applicant's teachings, a method for performing electrospray ionization utilizing the above-described exemplary interface devices is provided. In some aspects, a method is provided that comprises transmitting a fluid sample containing one or more analytes of interest from a first conduit to a second conduit, the first conduit defining a first microchannel extending between an entrance end for receiving the fluid sample and an exit end for transmitting said fluid sample therefrom and the second conduit defining a second microchannel extending between an entrance end for receiving the fluid sample transmitted from the exit end of the first microchannel and a discharge end. At least a portion of the second conduit can comprise a porous surface and a housing can at least partially surround the first and second conduit and can define a fluid chamber between an inner surface of the housing and the porous surface of the second conduit, the housing having at least one opening through which the second conduit extends from within the housing into an ionization chamber. The method can also comprise applying an electrical signal to an electrode in contact with a conductive fluid contained within the fluid chamber of the housing so as to provide an electrical current between the conductive fluid and the fluid sample within the first and/or second conduits via the porous surface. The fluid sample can then be discharged from the discharge end of the second conduit so as to ionize the one or more analytes within the ionization chamber of the mass spectrometer system, and mass spectrometric analysis on said one or more ionized analytes can be performed. In various aspects, the first conduit can comprise a capillary electrophoresis device, or alternatively, the method can comprise coupling the first conduit to a liquid chromatography column.

In various aspects, the method can further comprise coupling the first and second conduit such that the exit end of the first conduit transmits fluid to the entrance end of the second conduit. By way of example, the first and second conduits can be coupled by applying an adhesive, by a mechanical attachment (e.g., clamp), or by a coupling mechanism that surrounds a junction of the first and second conduits so as to provide a fluid tight seal. For example, the coupling mechanism can secure the first and second conduits to one another and maintain the alignment thereof by compression fit. In some exemplary aspects, the method can comprise applying heat to a coupling body made of a material that is configured to shrink upon the application of heat such that the shrinking coupling body serves to secure and align the first and second conduits with one another. In various aspects, the housing can comprise two bodies, each of which comprises a groove configured to fit an outer diameter of the first and second conduits, and the method can comprise disposing at least a portion of the first and second conduits are fluidically coupled when disposed in the groove and joining the two bodies together (e.g., with a clamp). In various aspects, the method can further comprise sealing the opening about the second conduit. In some aspects, the method can further comprise filling the fluid chamber with said conductive fluid.

In accordance with various aspects of the applicant's teachings, a method for manufacturing an interface for an electrospray ionization source is provided, the method comprising providing a first conduit defining a first microchannel for fluid flow, the first microchannel having an entrance end for receiving a fluid sample containing one or more analytes of interest and an exit end for transmitting said fluid sample therefrom, and providing a second conduit defining a second microchannel for fluid flow, the second microchannel having an entrance end for receiving the fluid sample transmitted from the exit end of the first microchannel and a discharge end for discharging said fluid sample into an ionization chamber of a mass spectrometer system. The method can also comprise forming a plurality of pores in at least a portion of the second conduit, and coupling the first conduit to the second conduit such that the exit end of the first microchannel is aligned with the microchannel of the second conduit so as to allow continuous fluid flow from the exit end of the first microchannel into the entrance end of the second microchannel. At least a portion of the first and second conduit can be disposed within a housing defining a fluid chamber between an inner surface of the housing and the porous surface of the second conduit, the housing having at least one opening through which the second conduit is configured to extend from within the housing into the ionization chamber. In some aspects, the method can further comprise associating an electrode with the interface, the electrode configured to be disposed in fluid contact with a conductive fluid contained within the fluid chamber, the electrode configured to be coupled to a power supply so as to provide an electrical current between the conductive fluid and the fluid sample within the second microchannel via the porous surface. In various aspects, the method can comprise forming the porous surface using one of acid etching, base etching, mechanical drilling, wherein the porous surface comprises a plurality of pores having an average size in a range of about 1 nm to about 40 nm. In some aspects, the method can comprise modifying a shape of the discharge end of the second conduit (e.g., via polishing, etching, etc.). In exemplary aspects, the porous surface can be formed and/or the shape of the discharge end can be modified prior to coupling the first and second conduits.

These and other features of the applicant's teaching are set forth herein.

BRIEF DESCRIPTION OF THE DRAWINGS

The skilled person in the art will understand that the drawings, described below, are for illustration purposes only. The drawings are not intended to limit the scope of the applicant's teachings in any way.

DETAILED DESCRIPTION

Figure 1:
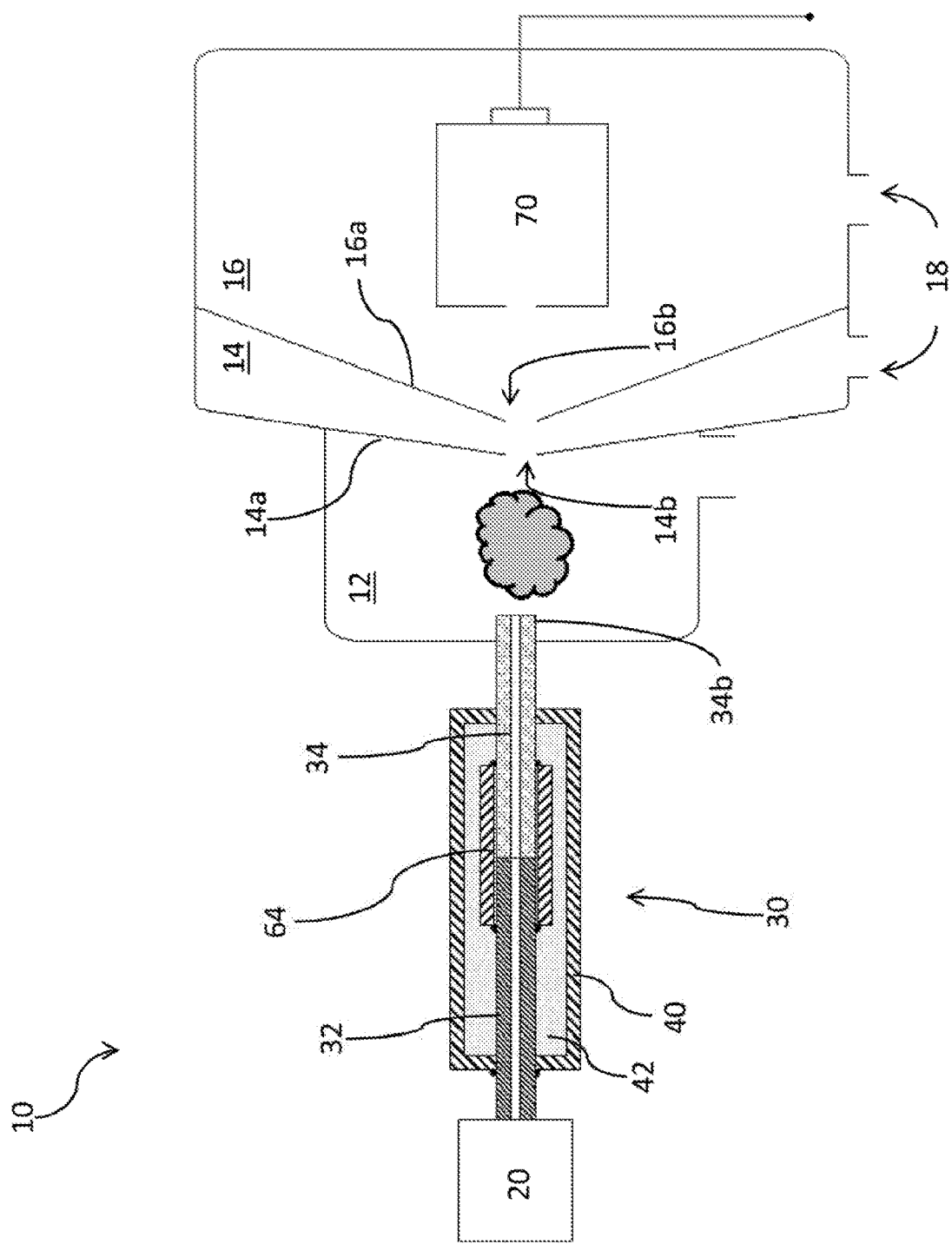
FIG. 1, in a schematic diagram, illustrates an exemplary system comprising an interface for an electrospray ion source of a mass spectrometer system in accordance with various aspects of the applicant's teachings.

It will be appreciated that for clarity, the following discussion will explicate various aspects of embodiments of the applicant's teachings, while omitting certain specific details wherever convenient or appropriate to do so. For example, discussion of like or analogous features in alternative embodiments may be somewhat abbreviated. Well-known ideas or concepts may also for brevity not be discussed in any great detail. Those skilled in the art will understand that the methods, systems, and apparatus described herein are non-limiting exemplary embodiments and that the scope of the applicant's disclosure is defined solely by the claims. While the applicant's teachings are described in conjunction with various embodiments, it is not intended that the applicant's teachings be limited to such embodiments. On the contrary, the applicant's teachings encompass various alternatives, modifications, and equivalents, as will be appreciated by those of skill in the art. The features illustrated or described in connection with one exemplary embodiment may be combined with the features of other embodiments. Such modifications and variations are intended to be included within the scope of the applicant's disclosure.

The present teachings generally relate to apparatus, systems, and methods for providing a sample flow through a conduit from a sample source for electrospray ionization. In various aspects, the conduit can be an analytical conduit (e.g., an analytical capillary) used in sample separation techniques such as CE and HPLC to an ionization chamber for electrospray ionization therein. In accordance with various aspects of the present teachings, the apparatus, systems, and methods can provide an electrical connection to the sample fluid at the exit end of the analytical conduit via a porous portion of an emitter conduit that can be coupled to the analytical conduit so as to provide low-dead volume, low-impedance, continuous flow into the emitter conduit. By separately manufacturing the analytical conduit and the porous emitter, a wide variety of analytical and emitter capillary devices can be utilized with one another, with each conduit being physically and/or chemically optimized for the particular application. In various aspects, the emitter conduit can comprise a tightly-controlled, tunable pore structure of a material exhibiting chemical properties (e.g., a highly-pure silica) that can be optimized for use as an ESI emitter, for example, by subjecting the discharge end to polishing to optimize the tip shape, while the analytical conduit can be separately optimized (e.g., using a coating process that may not be compatible with the formation of the porous structure and/or the emitter material). Additionally, as discussed in detail below, in various aspects, an electrical signal can be applied to the sample fluid within the porous emitter by providing an electrode in contact with a conductive fluid surrounding the porous portion such that electrical current can be provided thereto while reducing the possibility of analytes within the sample fluid undergoing electrochemical reactions and/or electrolytically-generated gases being transmitted through the analytical flow path.

FIG. 1 schematically depicts an embodiment of an exemplary system 10 in accordance with various aspects of the applicant's teachings for ionizing and mass analyzing analytes received from a sample source 20, the system including an interface 30 providing a sample flow from the sample source 20 through an first conduit 32 (e.g., an analytical capillary) and into an emitter conduit 34 (e.g., an electrospray capillary) for discharging the liquid sample from the emitter conduit's outlet end 34b into an ionization chamber 12. As shown in FIG. 1, the exemplary system 10 includes a mass analyzer 70 in fluid communication with the ionization chamber 12 for downstream processing and/or detection of ions generated by the electrospray ionization. As discussed in further detail below, the interface 30 generally includes a housing 40 disposed about a fluidic junction between the first conduit 32 and the emitter conduit 34 (e.g., coupled via coupling element 64), the housing defining a fluid chamber 42 containing a conductive fluid through which an electrical current can be passed. Additionally, as discussed below, the emitter conduit 34 can comprise a porous section in contact with the electrolytic fluid within the fluid chamber 42 such that an electrical current can pass into the liquid sample within the emitter conduit 34 and/or the first conduit 32.

The sample source 20 can have a variety of configurations such that the first conduit 32 receives a sample flow for electrospray ionization, including a reservoir containing a fluid sample that is delivered to the sample source (e.g., pumped), infusion, a liquid chromatography (LC) column, a capillary electrophoresis (CE) device, and via an injection of a sample into a carrier liquid. The conduits 32, 34 can have a variety of shapes and sizes, and can be formed from the same or different materials. In some aspects, the first conduit 32 can be made of a material and in a form to optimize its function as an analytical conduit for sample separation techniques such as CE and HPLC, while the emitter conduit 34 can be made of a different material and/or a differently-treated material to optimize its use as an electrospray emitter. Thus, in accordance with various aspects of the present teachings, the different conduits 32, 34 can be subjected to different processes prior to coupling, for example, by subjecting the discharge end 34b to polishing to optimize the tip shape (e.g., as discussed below with reference to FIGS. 7A-C and 8A-D), while the analytical conduit can be separately optimized (e.g., using a coating process that may not be compatible with the formation of the porous structure and/or the emitter material). By way of example, the emitter conduit 34 can comprise a material exhibiting chemical properties (e.g., a highly-pure silica) suitable for use as an ESI emitter, with the porous section being formed to allow the electrical current to applied to the liquid sample flowing therethrough. The pores of the porous section can be made by a variety of processing including, for example, mechanical formation (e.g., drilling with mechanical tools)

and etching. In some preferred aspects, the porous section can be etched with an acid or base solution (e.g., HF solution), with etching times being dependent upon the concentration of the acid or base solution. In some aspects, for example, the emitter conduit 34 can be prepared from a phase-separated glass material that can be acid-treated to produce a porous section having a very narrow pore-size distribution. The pore size can be tuned by varying the composition of the glass before the phase separation and the concentration and duration of the acid treatment. In certain aspects, the average pore size can be in a range between about 1 and about 40 nm, and more preferably between 2 and 20 nm (e.g., about 4 nm), such that the porous section of the second conduit 34 allows passage of ions to support the current required to support the electrospray but the pores are small enough to cause ionic double layer overlap in the pores and suppress electro-osmotic flow which could drive fluid from the fluid chamber 42 into the inside of the conduit 42 through the pores.

In some aspects, larger average pore sizes (e.g., in a range of between about 40 nm and about 100 nm) can alternatively be utilized to intentionally force conductive fluid from the fluid chamber 42 into the emitter conduit 34 as a "makeup flow," and within which additives may also be introduced to the liquid sample to enhance the electrospray ionization and/or to react with certain analytes eluting from the separation capillary, by way of example. As will be appreciated by a person skilled in the art in light of the present teachings, when a voltage is applied across a solution-containing dielectric material such as silica having an average pore size about ten times the Debye double-layer thickness, fluid can move through the porous section of the emitter conduit.

The first conduit 32 and emitter conduit 34 can also be formed in a variety of shapes. While the cross-section of the exemplary conduits is depicted as being cylindrical, it will be appreciated that the conduits and/or the microchannels defined thereby can be exhibit other cross-sectional shapes (e.g., square, oval). In some aspects, the outer and inner diameter of the various conduits can be separately selected so as to meet the needs of the apparatus/application. By way of example, the emitter conduit 34 can be manufactured to have to an outer and inner diameter selected so as to optimize the delivery of current through the pores, while nonetheless allowing the emitter conduit 34 to be coupled to the first conduit 32 with a matching inner diameter. By way of non-limiting example, the emitter conduit 34 can exhibit an inner diameter of less than about 100 µm (e.g., about 75 µm, microchannels having a diameter in a range between about 15 µm and about 30 µm) and an outer diameter on the order of about 300 µm to about 400 µm to match the diameter of capillaries conventionally used in low-flow nanoLC applications. Similarly, the size of the emitter conduit 34 can be selected to match the diameter of capillaries utilized in CE-MS, depending on the particular application.

As shown in FIG. 1, the emitter conduit 34 can extend out of the housing 40 and terminate in a discharge end 34*b* disposed within the ionization chamber 12 for discharging the liquid sample therein. By way of example, the outlet end 34*b* of the emitter conduit 34 can atomize, aerosolize, nebulize, or otherwise discharge (e.g., spray) the desorption solvent into the ionization chamber 12 to form a sample plume comprising a plurality of micro-droplets of liquid sample generally directed toward (e.g., in the vicinity of) the curtain plate aperture 14*b* and vacuum chamber sampling orifice 16*b*. Analytes contained within the micro-droplets can be ionized (i.e., charged), for example, as the sample plume is generated. By way of non-limiting example and as otherwise discussed herein, the housing 40 can be associated with an electrode in electrical contact with conductive fluid within the housing and effective to electrically couple to apply an electrical signal (e.g., voltage) to the liquid sample within the emitter conduit 34 via the pores of the porous section of the emitter conduit 34. Micro-droplets contained within the sample plume can thus be charged by the voltage applied to the electrode such that as the liquid within the micro-droplets evaporates during desolvation in the ionization chamber 12, bare charged analyte ions are released and drawn toward and through the apertures 14*b*, 16*b* and focused (e.g., via one or more ion lens) into the mass analyzer 70. As discussed in detail below with reference to FIG. 4, in some aspects of the present teachings, a source of pressurized gas (e.g. nitrogen, air, or noble gas) can supply a high velocity nebulizing gas flow which surrounds the discharge end 34*b* of the emitter conduit 34 and interacts with the fluid discharged therefrom to enhance the formation of the sample plume and the ion release within the plume for sampling by 14*b* and 16*b*, e.g., via the interaction of the high speed nebulizing flow and jet of liquid sample. The nebulizer gas can be supplied at a variety of flow rates, for example, in a range from about 0.1 L/min to about 20 L/min.

In the depicted embodiment, the ionization chamber 12 can be maintained at an atmospheric pressure, though in some embodiments, the ionization chamber 12 can be evacuated to a pressure lower than atmospheric pressure. The ionization chamber 12, within which analytes desorbed from the substrate 20 can be ionized as the desorption solvent is discharged from the electrospray electrode 64, is separated from a gas curtain chamber 14 by a plate 14*a* having a curtain plate aperture 14*b*. As shown, a vacuum chamber 16, which houses the mass analyzer 70, is separated from the curtain chamber 14 by a plate 16*a* having a vacuum chamber sampling orifice 16*b*. The curtain chamber 14 and vacuum chamber 16 can be maintained at a selected pressure(s) (e.g., the same or different sub-atmospheric pressures, a pressure lower than the ionization chamber) by evacuation through one or more vacuum pump ports 18.

While the systems, devices, and methods described herein can be used in conjunction with many different configurations of a mass spectrometer systems, It will also be appreciated by a person skilled in the art and in light of the teachings herein that the mass analyzer 70 can have a variety of configurations. Generally, the mass analyzer 70 is configured to process (e.g., filter, sort, dissociate, detect, etc.) sample ions generated by the ion source. By way of non-limiting example, the mass analyzer 70 can be a triple quadrupole mass spectrometer, or any other mass analyzer known in the art and modified in accordance with the teachings herein. Other non-limiting, exemplary mass spectrometer systems that can be modified in accordance various aspects of the systems, devices, and methods disclosed herein can be found, for example, in an article entitled "Product ion scanning using a Q-q-$Q_{linear}$ ion trap (Q TRAP®) mass spectrometer," authored by James W. Hager and J. C. Yves Le Blanc and published in Rapid Communications in Mass Spectrometry (2003; 17: 1056-1064), and U.S. Pat. No. 7,923,681, entitled "Collision Cell for Mass Spectrometer," which are hereby incorporated by reference in their entireties. Other configurations, including but not limited to those described herein and others known to those skilled in the art, can also be utilized in conjunction with the systems, devices, and methods disclosed herein. For instance other suitable mass spectrometers include single quadrupole, triple quadrupole, ToF, trap, and hybrid analyzers. It will further be appreciated that any number of additional elements can be included in the system 10 including, for example, an ion mobility spectrometer (e.g., a differential mobility spectrometer) that is disposed between the ionization chamber 12 and the mass analyzer 70 and is configured to separate ions based on their mobility through a drift gas in high- and low-fields rather than their mass-to-charge ratio). Additionally, it will be appreciated that the mass analyzer 70 can comprise a detector that can detect the ions which pass through the analyzer 70 and can, for example, supply a signal indicative of the number of ions per second that are detected.

Figure 2:
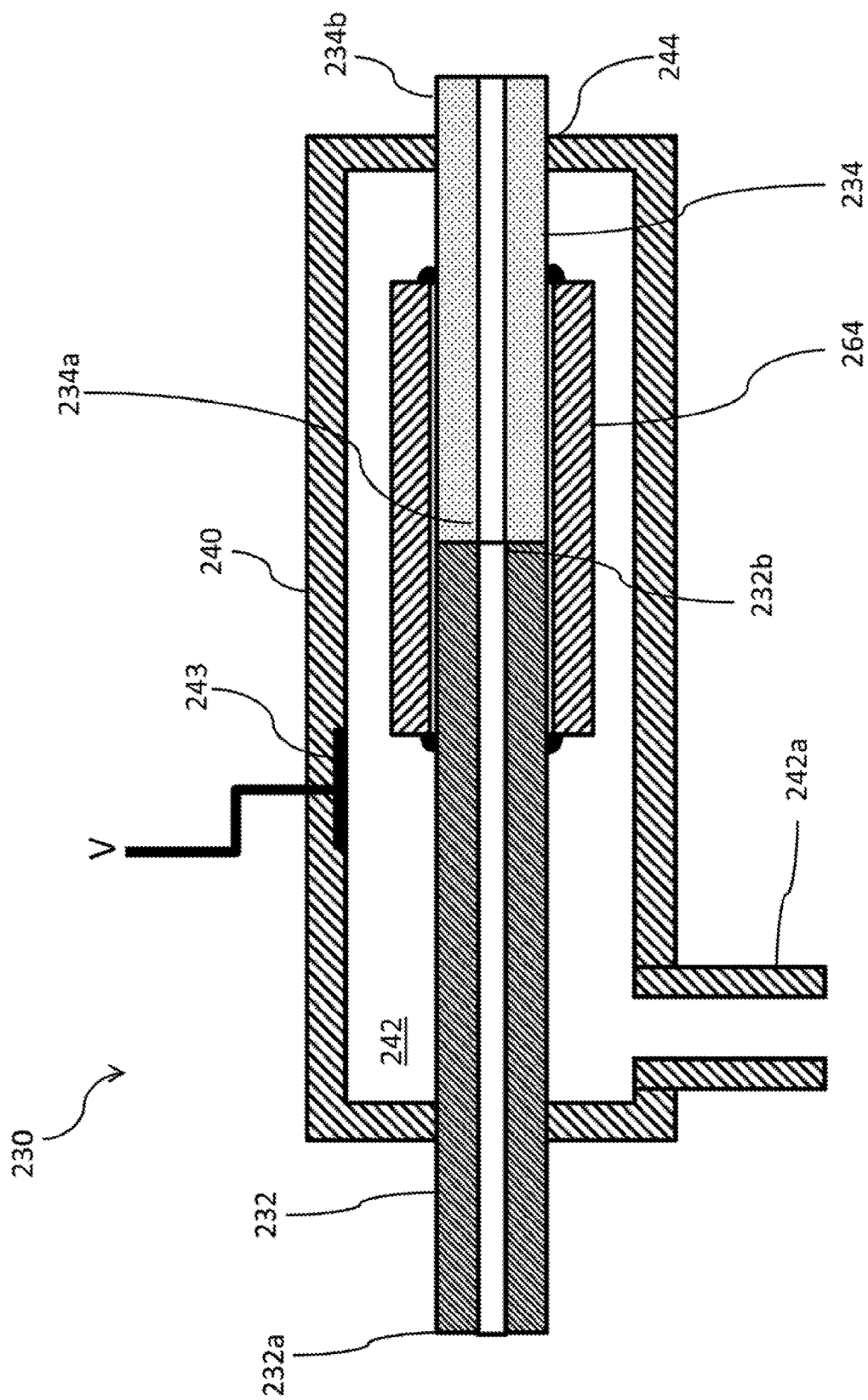
FIG. 2, in a schematic diagram, illustrates an exemplary interface for use in the system of FIG. 1, in accordance with various aspects of the applicant's teachings.

With reference now to FIG. 2, an exemplary interface 230 in accordance with various aspects of the applicant's teachings is schematically depicted. As shown, the interface 230 comprises a housing 240 within which a first conduit 232 (e.g., fluidically coupled to a liquid sample source, such as a CE device or HPLC column) and a second conduit 234 are fluidically coupled. That is, the first conduit 232 defines a channel (e.g., a microchannel) that extends from an entrance end 232a to an exit end 232b, and the second conduit defines a channel (e.g., a microchannel) that extends from an entrance end 234a to a discharge end 234b that extends from through the housing 240 at opening 244. The first and second conduits 232, 234 are coupled such that liquid sample flows from the first conduit 232 into the second conduit 234 at the fluidic junction between the microchannels. In various aspects, it may be preferable to minimize the dead space between the microchannels of the first and second conduits 232, 234, for example, by having the inner diameters of the first and second conduits 232, 234 being substantially equivalent (e.g., to allow for non-dispersive flow). It will be additionally appreciated in light of the present teachings that in some aspects the outer diameters of the conduits can also be substantially equivalent to ease their alignment and/or coupling, for example, via the coupling element 264. In various aspects, the ends of the first and second conduits 232, 234 that are configured to be coupled to one another, can be cut, cleaved, and/or polished to help maintain a fluid-tight coupling. In some aspects, for example, the respective ends can be prepared to be substantially orthogonal to the axis of fluid flow (i.e., the central longitudinal axis of the microchannels).

The coupling element 264 can have a variety of configurations but is generally effective to secure the first and second conduits 232, 234 to one another, while ensuring the alignment and fluidic coupling of their microchannels. As shown in FIG. 2, for example, the connecting element 264 can comprise a sleeve having an inner diameter that is slightly larger than the outer diameter of the first and second conduits 232, 234. In various aspects, the connecting element 264 (e.g., sleeve) can comprise a rigid component made of a non-conducting material (e.g., plastic, ceramic, etc.) that is machined, extruded, drawn, etc. to appropriate dimensions. To assemble the parts, the conduits 232, 234 can be aligned within the connecting element 264 and can be fixed thereto using an adhesive, a clamping mechanism, and/or any other mechanical fixture known in the art and modified in accordance with the present teachings, by way of non-limiting example. As shown for example in FIG. 2, the upstream (left) and downstream (right) ends of the coupling element 264 can be circumferentially secured (e.g., sealed) to the outer surface of the conduits 232, 234 utilizing an adhesive.

As noted above with respect to FIG. 1, the exemplary housing 240 additionally defines a fluid chamber 242 that can be configured to contain a conductive fluid capable of transmitting an electrical current to the liquid sample within the conduits 232, 234 via a porous region of the second conduit 234. Though the entire exemplary conduit 234 depicted in FIG. 2 comprises pores, it will be appreciated in view of the present teachings that pores can alternatively be formed in only a portion of the conduit 234, for example, a portion of the conduit 234 disposed within the housing 240 and in fluid contact with the conductive fluid contained within the fluid chamber 242. As shown, an electrode 243 on an inner surface of the housing 240 can be coupled to a power source (e.g., a DC voltage source) to apply an electrical signal to the conductive fluid in contact with the electrode 243. It will be appreciated in light of the present teachings that because contact between the electrode 243 and the conductive fluid within the fluid chamber 242 occurs outside of the conduit 234, analytes within the sample fluid will not undergo electrochemical reactions at the electrode 243. Moreover, bubbles resulting from redox reactions of the conductive fluid at the electrode 243 are less likely to effect the analytical separation and/or MS performance (e.g., cause by spurting at the ion source due to the discharge of bubble).

While a fixed volume of conductive fluid can be contained within the fluid chamber 242 of the housing 240, in various exemplary embodiments, a conductive fluid delivery conduit 242a can be provided for fluidically coupling the fluid chamber 242 to a reservoir of the conductive fluid through which the conductive fluid can be delivered to the fluid chamber 242 to replenish the conductive fluid within the fluid chamber 242. Suitable conductive fluids that can be provided to the fluid chamber 242 include, water, acid, or base solution, such as 0.1% acetic or formic acid or ammonium acetate solution, all by way of non-limiting example.

Figure 3:
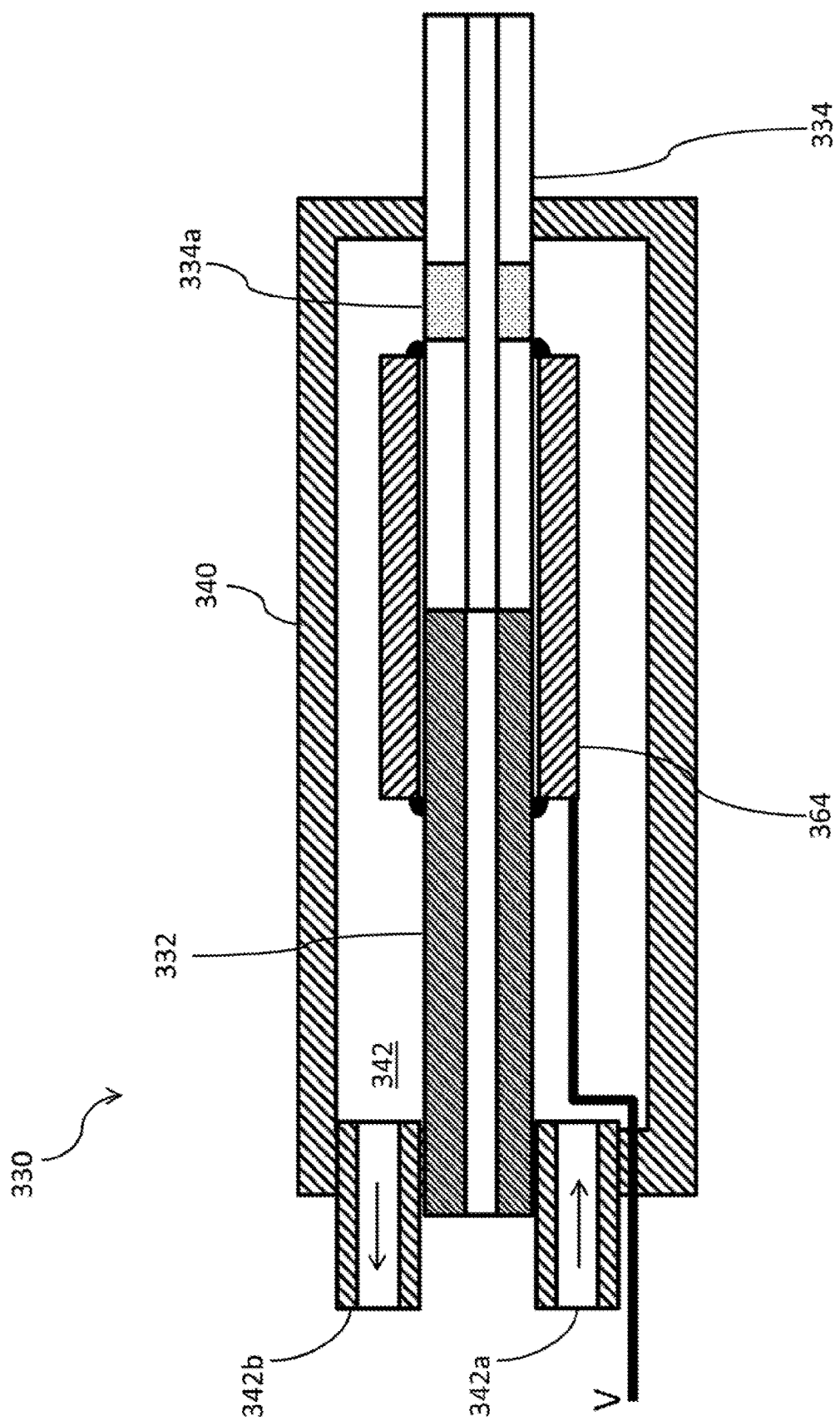
FIG. 3, in a schematic diagram, illustrates another exemplary interface for use in the system of FIG. 1, in accordance with various aspects of the applicant's teachings.

With reference now to FIG. 3, another exemplary interface 330 in accordance with various aspects of the present teachings is depicted. The interface 330 is similar to interface 230 depicted in FIG. 2, but differs in that the housing comprises multiple conductive fluid ports 342a,b that can enable the fluid chamber 342 to be fluidically coupled to a reservoir of conductive fluid (e.g., via inlet port 342a) and to a waste reservoir (e.g., via outlet port 342b). In this manner, conductive fluid can be continuously circulated/replenished within the fluid chamber 342.

The exemplary interface 330 also differs from that of FIG. 2 in that at least a portion of the connecting element 364 (e.g., sleeve) that joins first conduit 332 and second conduit 334 can be made of a conductive material (e.g., metal). As shown, the connecting element 364 can be coupled to a power source, and can thus serve as the electrode for generating an electrical current within the conductive fluid contained within the fluid chamber 342 and the sample fluid within the emitter conduit 334. As discussed above with reference to FIG. 2, though the entire conduit 234 comprises a porous surface, in the conduit 334 of FIG. 3 only a portion 334a disposed within the housing 340 and in fluid contact with the conductive fluid contained within the fluid chamber 342 is formed as a porous region (e.g., by selectively etching that region of a silica capillary).

Figure 4:
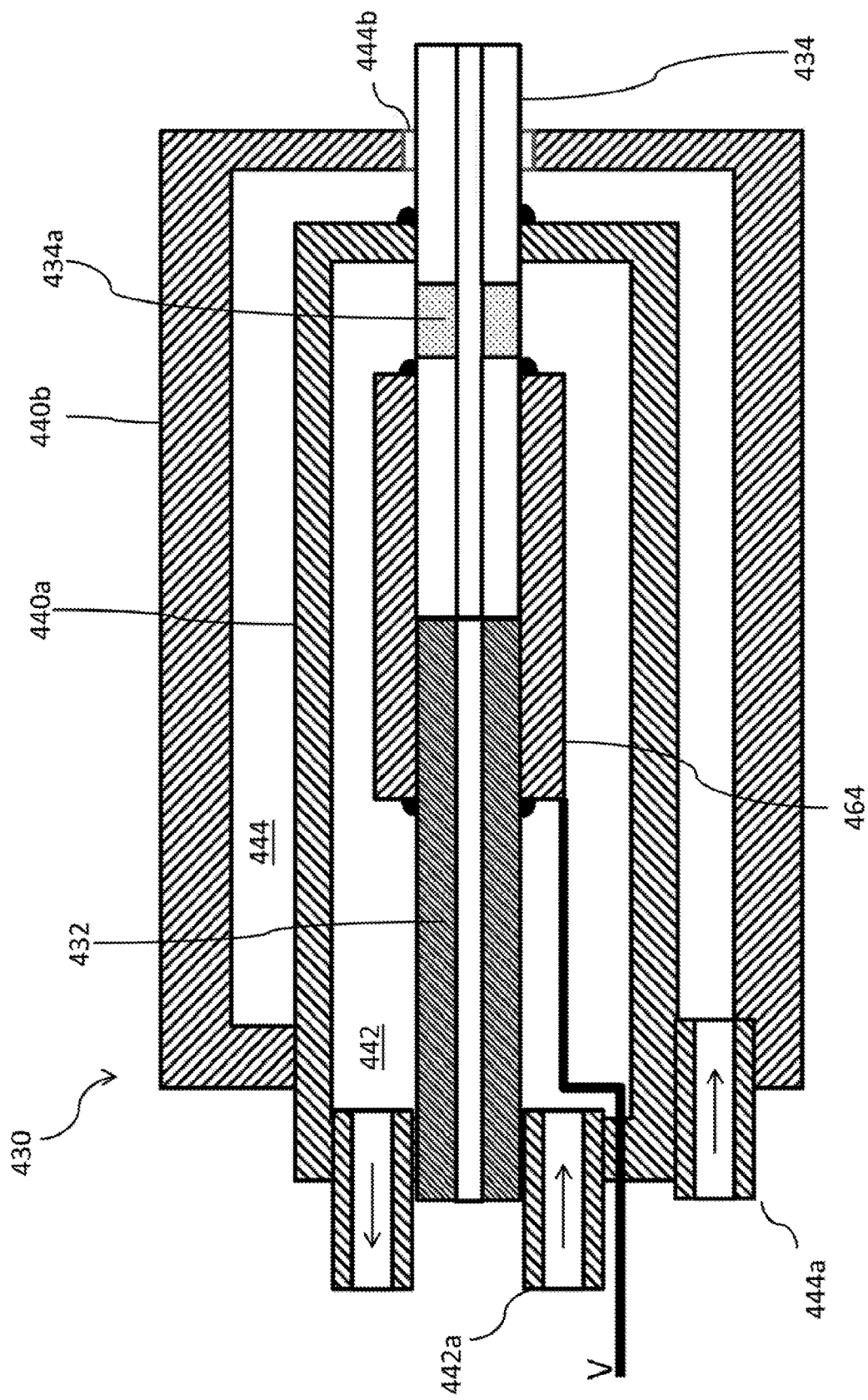
FIG. 4, in a schematic diagram, illustrates another exemplary interface for use in the system of FIG. 1, in accordance with various aspects of the applicant's teachings.
Figure 5:
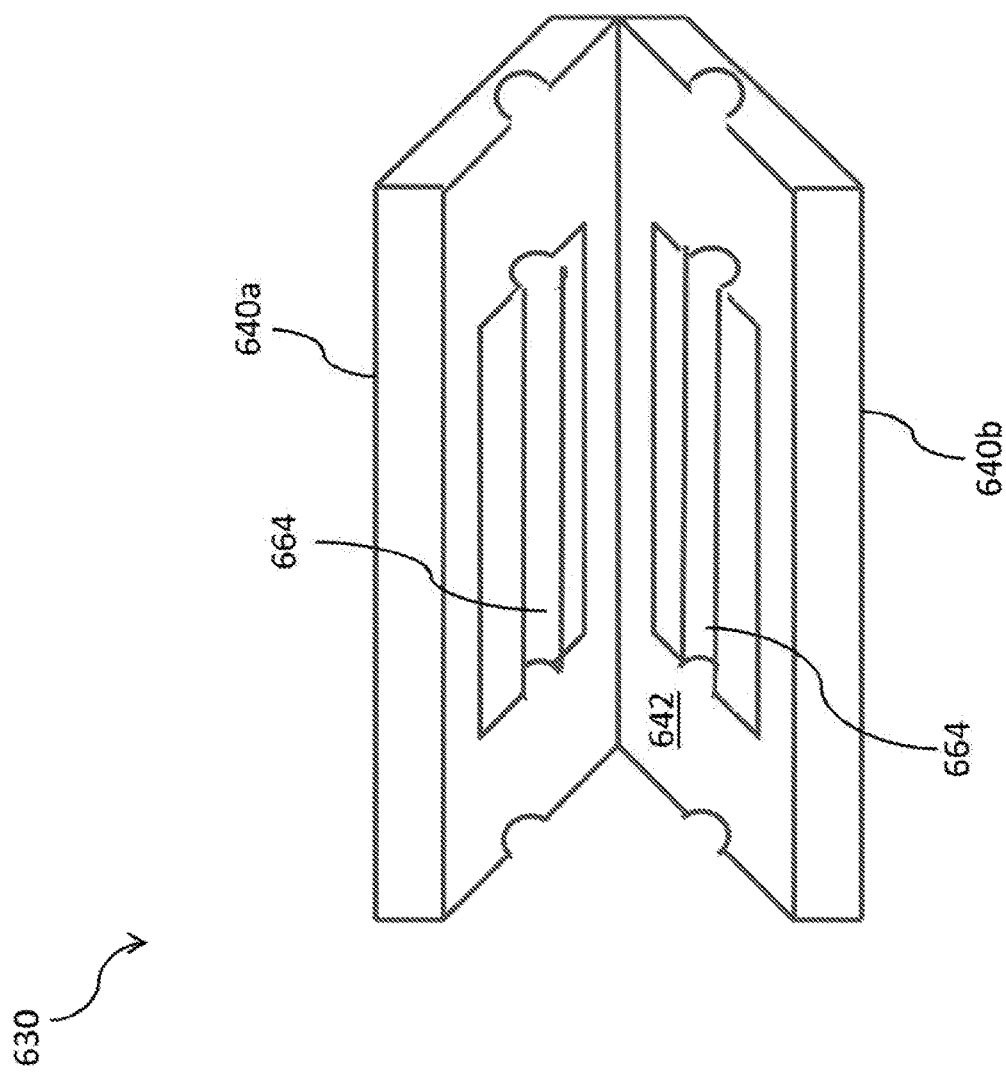
FIG. 5, in a schematic diagram, illustrates another exemplary interface for use in the system of FIG. 1, in accordance with various aspects of the applicant's teachings.
Figure 6:
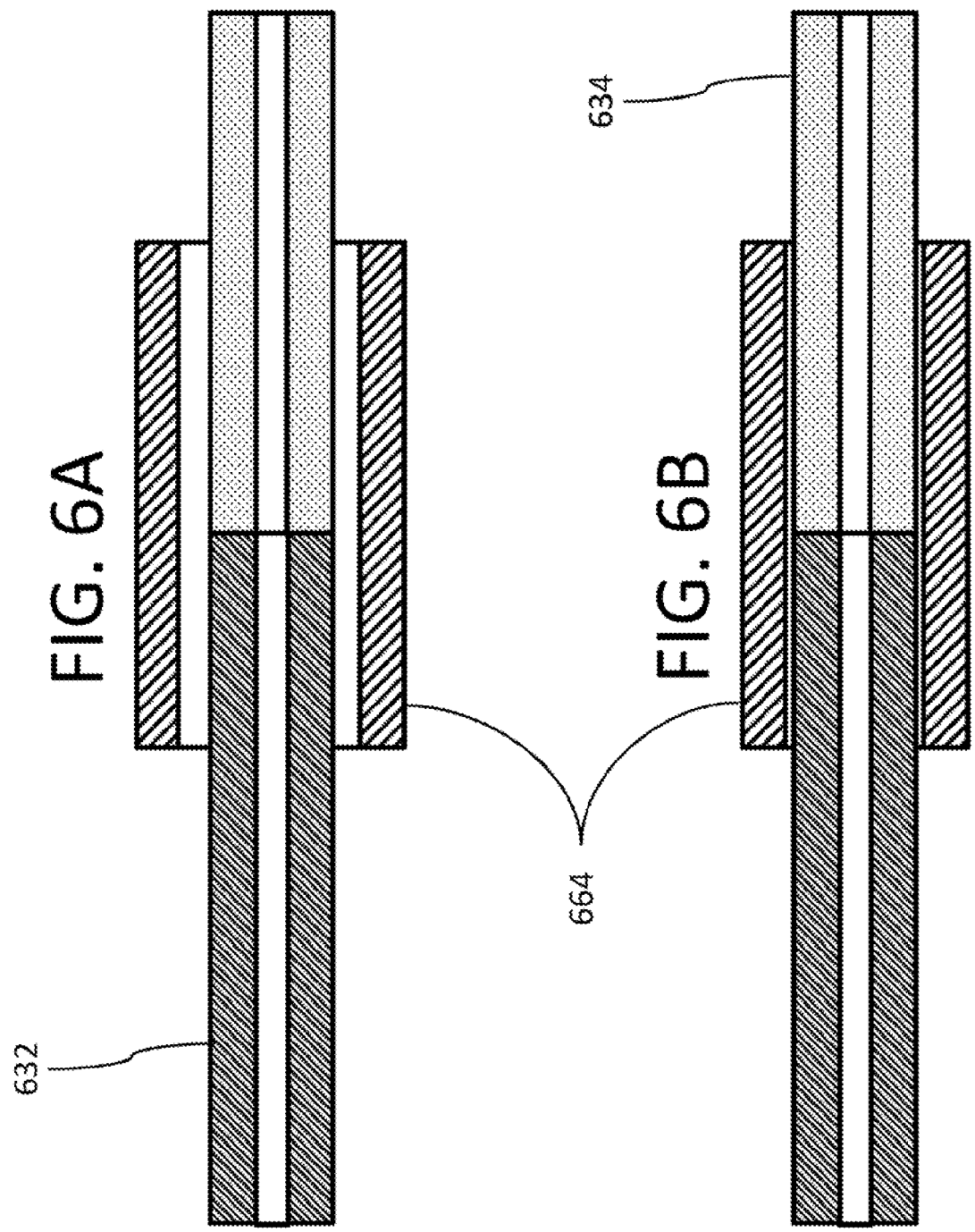
FIGS. 6A-B depict an exemplary coupling mechanism for coupling an analytical conduit to an emitter conduit in accordance with various aspects of the present teachings.
Figure 7:
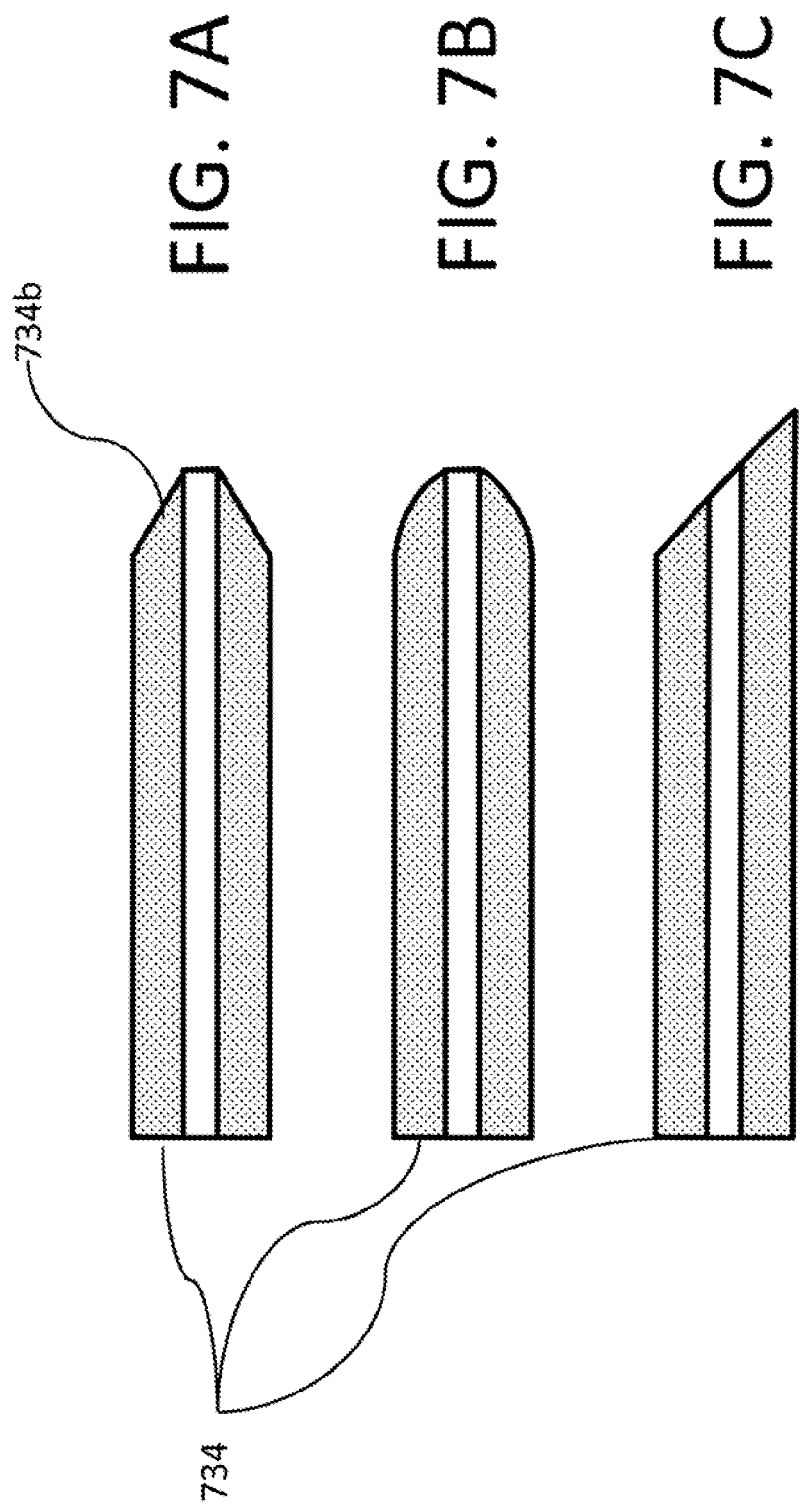
FIGS. 7A-C schematically depict exemplary shapes of the discharge end of an emitter conduit, in accordance with various aspects of the applicant's present teachings.
Figure 8:
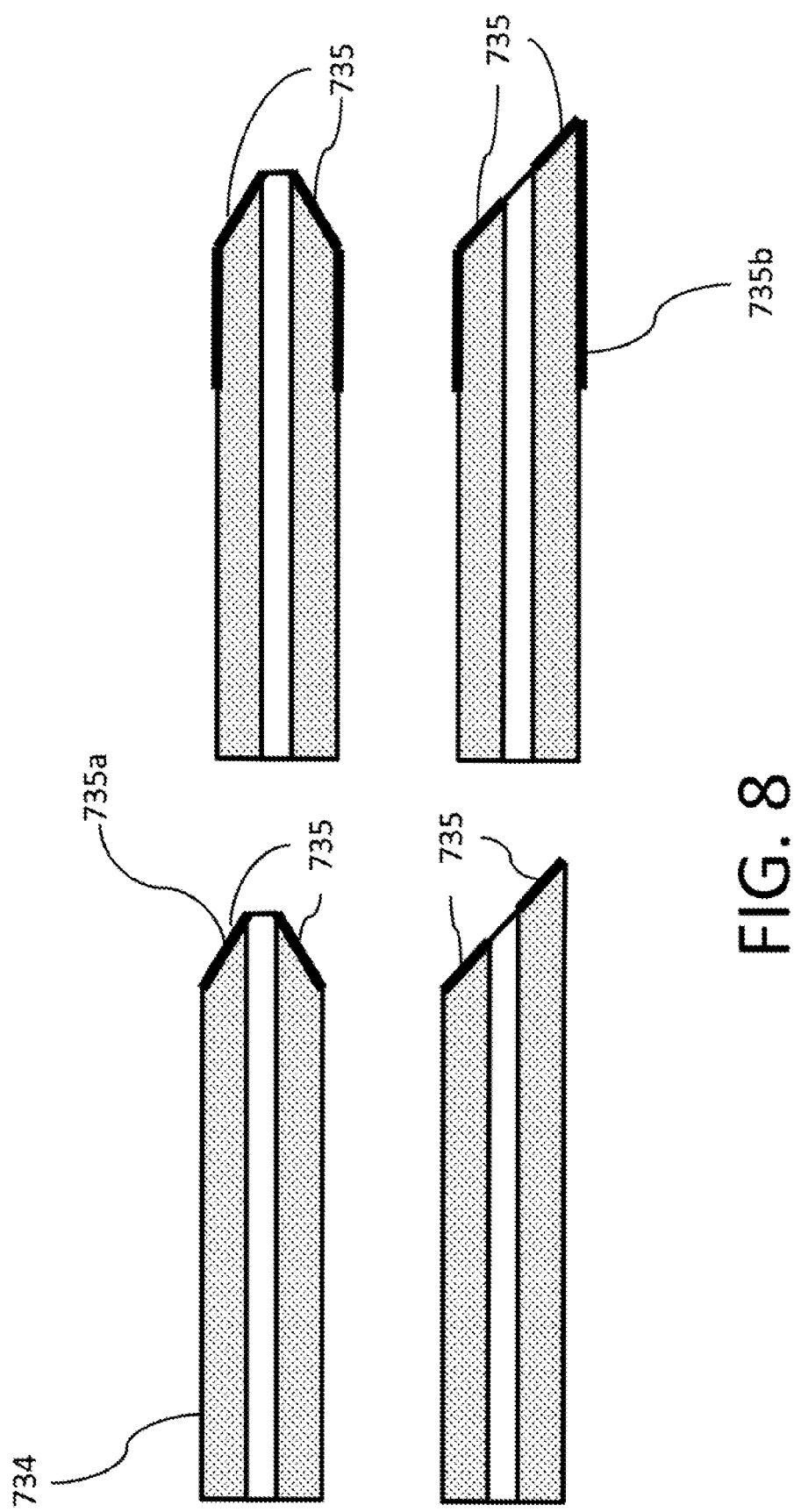
FIG. 8 schematically depict exemplary shapes of the discharge end of an emitter conduit, in accordance with various aspects of the applicant's present teachings.

With reference now to FIG. 4, another exemplary interface 430 in accordance with various aspects of the present teachings is depicted. The interface 430 is similar to interface 330 depicted in FIG. 3, and has fluid chamber 442 fluidically coupled to a reservoir of conductive fluid (e.g., via inlet port 442a) but differs in that the housing 440a,b defines two fluid chambers, one of which for containing conductive fluid and another for providing a nebulizing gas to the discharge end of the emitter conduit 434. That is, as shown in FIG. 4, the housing comprises an inner housing 440a that contains the conductive fluid to be placed in contact with the porous section 434a of the emitter conduit 434 and an outer housing 440b that at least partially surrounds the inner housing 440a. Connecting element 464 joins first conduit 432 and second/emitter conduit 434.

A source of pressurized gas (not shown) can thus supply a gas (e.g., via an input gas port 444a) to the gas chamber 444 formed between the inner and outer housing 440a,b. Whereas the inner housing 440a can be sealed to the emitter 434 (e.g., to prevent leakage of conductive fluid), the outer housing 440b can comprise a bore 444b that allows the gas supplied to the chamber 444 to flow through the bore 444b to surround the discharge end of the emitter conduit 434. As will be appreciated by those skilled in the art, the nebulizing gas can interact with the sample liquid discharged into the ionization chamber from the emitter conduit 434 to enhance the formation of the sample plume and the ion release within the plume, e.g., via the interaction of the high speed nebulizing flow and jet of liquid sample. The nebulizer gas can be supplied at a variety of flow rates, for example, in a range from about 0.1 L/min to about 20 L/min.

With reference now to FIG. 5, another exemplary interface in accordance with various aspects of the present teachings is depicted. As shown, the interface 630 can comprise two halves of a housing 640*a,b* that can be assembled about the analytical and emitter conduits (not shown) to align and secure the conduits to one another. The housing 640*a,b* can be made of molded plastic, for example, each half of which defines a semi-cylindrical channel 664 that is configured to match the outer surface shape of the conduits. In various aspects, the channels 664 can be lined with a compressible material (e.g., silicone or other soft polymer) that can compress against the outer surface of the conduits to provide for secure coupling and/or sealing against the outer surface. As discussed otherwise herein, the housing 640*a,b* can define a fluid chamber 642 at least about a porous section of the emitter conduit when secured therein, for example, that is configured to contain the conductive fluid in contact with an electrode and the porous section of the emitter conduit. In such aspects, the interface can be assembled by placing the conduits in the groove on one half, and the other half can be placed on top and compressed against the bottom half. Thus, a seal can be formed about the conduits, and the two halves can be secured to one another, for example, via a clip or a clamp. In some aspects, the various elements (e.g., the analytical and emitter conduits, the gas chamber, electrical connections, etc.) can be assembled as a microfabricated manifold, which provide a reduction in the number of components and integrated fluidics. In various aspects, the electrical connections can be patterned onto the microfluidic device to allow simple drop-in electrical connection to the device (e.g., via pogo-pin).

As noted above, the first and second conduits can be coupled to one another within the housing in a variety of manners (e.g., adhesive, mechanical coupling, clamping). With reference now to FIGS. 6A-B, another exemplary coupling element 664 in accordance with various aspects of the present teachings is depicted. As shown in FIG. 6A, a cylindrical sleeve comprising a heat shrinkable material can be provided have a larger inner diameter than the outer diameter of the analytical and emitter conduits 632, 634 in an initial state. To couple the conduits 632, 634 to one another, the conduits can be aligned within the connecting element 664 and heat can be applied to reduce the diameter connecting element 664 to compress against the circumference of the conduits. In such aspects, the shrinking process can help ensure the alignment of the conduits 632, 634. It will also be appreciated in view of the present teachings that in some aspects, the connecting element 664 can comprise a flexible material (e.g., a polymer, elastomer, etc.) that has a slightly smaller inner diameter relative to the outer diameter of the conduits 632, 634. In such aspects, the connecting element 664 can be radially expended (e.g., stretched) about the ends of the conduits to be coupled and can retain the alignment thereof via compression fit. Additional sealant (e.g., adhesive) can also be provided to secure the connecting element to the conduits 632, 634.

As noted above, methods and systems in accordance with various aspects of the present teachings allow for the separate manufacturing and optimization of a sample conduit (e.g., an analytical conduit) and the porous emitter. By way of example, the emitter conduits can be physically and/or chemically optimized without concomitant detrimental effects on the analytical conduit. For example, as shown in FIGS. 7A-7C, the discharge ends 734*b* of the exemplary emitter conduits 734 can be ground or polished to an optimum tip shape so as to tune the electrical field lines formed between the sprayer tip and the MS orifice when the voltage is applied to the conductive fluid within the housing, as otherwise discussed herein. That is, in addition to the flat surface facing the ionization chamber as shown in the figures above, the discharge end 734*b* can be formed in the shape of a pointed face (FIG. 7A), a rounded face (FIG. 7B), and a beveled face (FIG. 7C), all by way of non-limiting example.

With reference now to FIG. 8, the emitter conduits 734 can additionally be modified at the discharge end 734*b* using any coating process known in the art or hereafter developed, for example, to reduce wetting of the sprayer surface and thus confine the discharge into a narrow cone, which can be more efficient and less dispersive (FIG. 6). As shown in FIG. 8, the coating 735 can be applied to the face 735*a* of the discharge end 734*b* as well as to portions axially-upstream therefrom (e.g., portions 735*b*). Such exemplary treatments include treatment with liquid and/or gas phase reagents, such as Teflon AF that can be applied to create a Teflon-like surface. In exemplary aspects in which the entire emitter conduit 734 is porous, the reactant (e.g., Teflon AF) can penetrates into the pores prior to its transition into a solid material so as to produce a surface that is more robust to chemical and mechanical disruption. Alternatively, one could treat the surface with a reactive chemical approach that could employ, for example, chlorosilane chemistry to attach a selected moiety to the silica surface on the molecular level. These can be applied with liquid or gas reagents. These moieties could include hydrocarbons, halo carbons, or other functional groups as desired to control the surface interaction with the analytical fluid such that the spray geometry is optimized. As above, the porous nature of the emitter conduit 734 can provide added robustness. Similarly, the methods and systems in accordance with various aspects of the present teachings allow for the separate manufacturing and optimization of the analytical conduit utilizing any of a variety of treatment processes, and especially those that have heretofore been incompatible with the emitter conduit material itself or the processes described herein for forming a porous region within the emitter conduit, shaping its discharge end, or treating at least a portion of the emitter conduit.

It will be appreciated that various of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which alternatives, variations and improvements are also intended to be encompassed by the following claims.

The invention claimed is:

1. A device for interfacing with an electrospray ionization source, comprising:
a first conduit defining a first microchannel for fluid flow, the first microchannel having an entrance end for receiving a fluid sample containing one or more analytes of interest and an exit end for transmitting said fluid sample therefrom, the first conduit comprising quartz;
a second conduit defining a second microchannel for fluid flow, the second microchannel having an entrance end for receiving the fluid sample transmitted from the exit end of the first microchannel and a discharge end for discharging said fluid sample into an ionization chamber of a mass spectrometer system, at least a portion of the second conduit comprising a porous surface, the second conduit comprising silica, wherein the second conduit is coupled to the first conduit such that the exit end of the first microchannel is aligned with the microchannel of the second conduit so as to allow continuous fluid flow from the exit end of the first microchannel into the entrance end of the second microchannel;
a housing at least partially surrounding the first and second conduit and defining a fluid chamber between an inner surface of the housing and the porous surface of the second conduit, the housing having at least one opening through which the second conduit extends from within the housing into the ionization chamber; and
an electrode configured to be disposed in fluid contact with a conductive fluid contained within the fluid chamber, the electrode configured to be coupled to a power supply so as to provide an electrical current between the conductive fluid and the fluid sample within the second microchannel via the porous surface.

2. The device of claim 1, further comprising a coupling mechanism configured to surround a junction of the first and second conduits.

3. The device of claim 2, wherein the coupling mechanism is configured to maintain the alignment of the first and second conduits by compression fit.

4. The device of claim 2, wherein the coupling mechanism comprises adhesive.

5. The device of claim 2, wherein the coupling mechanism comprises the electrode.

6. The device of claim 1, wherein the housing comprises the electrode.

7. The device of claim 1, wherein the porous surface comprises a plurality of pores having an average size in a range of about 1 nm to about 40 nm.

8. The device of claim 1, wherein the porous surface comprises a plurality of pores having an average size in a range of about 40 nm to about 100 nm.

9. The device of claim 1, wherein an inner diameter of the first and second conduits is substantially equal.

10. The device of claim 1, wherein the first conduit comprises a capillary electrophoresis device and the second conduit comprises an electrospray emitter.

11. A method for performing electrospray ionization, comprising:
transmitting a fluid sample containing one or more analytes of interest from a first conduit, the first conduit comprising quartz, to a second conduit, the second conduit comprising silica, the first conduit defining a first microchannel extending between an entrance end for receiving the fluid sample and an exit end for transmitting said fluid sample therefrom and the second conduit defining a second microchannel extending between an entrance end for receiving the fluid sample transmitted from the exit end of the first microchannel and a discharge end, wherein at least a portion of the second conduit comprises a porous surface and wherein a housing at least partially surrounds the first and second conduit and defines a fluid chamber between an inner surface of the housing and the porous surface of the second conduit, the housing having at least one opening through which the second conduit extends from within the housing into an ionization chamber;
applying an electrical signal to an electrode in contact with a conductive fluid contained within the fluid chamber of the housing so as to provide an electrical current between the conductive fluid and the fluid sample within the first and second conduits via the porous surface;
discharging the fluid sample from the discharge end of the second conduit so as to ionize said one or more analytes within the ionization chamber of the mass spectrometer system; and
performing mass spectrometric analysis on said one or more ionized analytes.

12. The method of claim 10, further comprising coupling the first and second conduit such that the exit end of the first conduit transmits fluid to the entrance end of the second conduit.

13. The method of claim 11, further comprising sealing the opening about the second conduit.

14. The method of claim 10, further comprising filling the fluid chamber with said conductive fluid.

15. The method of claim 10, further comprising coupling the first conduit to a liquid chromatography column.

16. The method of claim 10, wherein the first conduit comprises a capillary electrophoresis device.

17. A method of manufacturing an interface for an electrospray ionization source, comprising:
providing a first conduit defining a first microchannel for fluid flow, the first conduit comprising quartz, the first microchannel having an entrance end for receiving a fluid sample containing one or more analytes of interest and an exit end for transmitting said fluid sample therefrom;
providing a second conduit defining a second microchannel for fluid flow, the second conduit comprising silica, the second microchannel having an entrance end for receiving the fluid sample transmitted from the exit end of the first microchannel and a discharge end for discharging said fluid sample into an ionization chamber of a mass spectrometer system
forming a plurality of pores in at least a portion of the second conduit;
coupling the first conduit to the second conduit such that the exit end of the first microchannel is aligned with the microchannel of the second conduit so as to allow continuous fluid flow from the exit end of the first microchannel into the entrance end of the second microchannel;
disposing at least a portion of the first and second conduit within a housing defining a fluid chamber between an inner surface of the housing and the porous surface of the second conduit, the housing having at least one opening through which the second conduit is configured to extend from within the housing into the ionization chamber; and associating an electrode with the interface, the electrode configured to be disposed in fluid contact with a conductive fluid contained within the fluid chamber, the electrode configured to be coupled to a power supply so as to provide an electrical current between the conductive fluid and the fluid sample within the second microchannel via the porous surface.

18. The method of claim 17, further comprising forming the porous surface using one of acid etching, base etching, mechanical drilling, wherein the porous surface comprises a plurality of pores having an average size in a range of about 1 nm to about 40 nm.

19. The method of claim 18, further comprising modifying a shape of the discharge end of the second conduit prior to coupling the first and second conduits.

* * * * *